3,526,523
REFRACTORY FURNACE WALL COATING
Artemas F. Holden, 2195 S. Milford Road,
Milford, Mich. 48042
No Drawing. Continuation of application Ser. No. 284,321, May 31, 1963. This application June 7, 1967, Ser. No. 644,054
Int. Cl. C04l 35/52
U.S. Cl. 106—56  4 Claims

ABSTRACT OF THE DISCLOSURE

A coating composition for refractory furnace walls providing protection against spalling and cracking under conditions of repeated heating and cooling for longer furnace life as well as high "black body" emissivity values through use of graphite coated with aluminum oxide in a vehicle comprising the water reaction product of a glass phase ceramic including such materials as calcium fluoride, silica sand, lime, sodium carbonate and sodium fluoride, or sodium silico fluoride together with sodium or potassium silicate.

---

This invention relates to a refractory coating composition having protective and black body heat transfer characteristics adapted for application to the hot face of furnace refractories.

This application is a continuation of my co-pending application, Ser. No. 284,321, filed May 31, 1963, now abandoned.

One object of the coating is to provide a high "emissivity" value characteristic of "black bodies" in order to improve the efficiency of absorption and radiation of heat energy thereby increasing the rate and reducing the time of furnace heat-up to required temperature, increasing the rate and decreasing the time of furnace cooling, and consequently increasing the number of workload cycles possible in a given period of time. Another object is to provide protection to refractories and insulations against spalling and cracking and to prolong furnace life; other objects are to provide more uniform heating; to reduce fuel consumption; to increase production; to provide a high degree of re-radiation of radiant heat energy to work in process; to permit the use of coated insulating bricks in place of hard bricks; to reduce the mass of the furnace's inner lining; to reduce the energy requirement to attain operating temperatures; to provide a coating capable of withstanding extremely high temperatures, for example in the order of 3600° F.; to provide a coating which can be applied at room temperature in a liquid vehicle to a room temperature refractory wall with conventional brush, roller or spray techniques; and to improve the life and decrease the down time for furnace wall repairs.

These and other objects will be more apparent from the following detailed description of preferred embodiments of the invention and the application to typical installations.

The coating comprises essentially the combination of a glass phase ceramic compound having a molten temperature range within 1400–2400° F. and preferably in the order of 1600–1800° F. with ceramic solids having a melting or decomposition temperature in excess of 2700° F. and preferably substantially above the fusion temperature of the refractory to which coating is to be applied.

More specifically, each of the three following formulae for glass phase ceramic compounds has been found suitable, the percentages being given by weight:

GLASS PHASE CERAMIC COMPOUNDS

No. 1

| | Percent |
|---|---|
| Calcium fluoride | 30 |
| Silica sand | 35 |
| Calcium oxide (lime) | 15 |
| Sodium carbonate | 15 |
| Sodium fluoride | 5 |

No. 2

| | Percent |
|---|---|
| Calcium fluoride | 28 |
| Silica sand | 24 |
| Sodium silico fluoride | 16 |
| Sodium carbonate | 16 |
| Calcium oxide (lime) | 16 |

No. 3

| | Percent |
|---|---|
| Calcium fluoride | 30 |
| Silica sand | 35 |
| Sodium silico fluoride | 18 |
| Calcium oxide | 8½ |
| Sodium carbonate | 8½ |

From the foregoing examples it will be seen that such suitable formulae include in the order of 28–30% calcium fluoride; 24–35% silica sand; 8½–16% calcium oxide; 8½–16% sodium carbonate; and 5–18% sodium fluoride or sodium silico fluoride, the latter two elements serving equivalent functions in these compositions.

A typical example of the other materials which may be combined with any of the compounds of Formulae 1, 2 or 3 which have been found to give excellent results are the following:

| | Percent |
|---|---|
| (1) Silicon carbide | 65 |
| (2) Sodium or potassium silicate | 12.5 |
| (3) Any portion of Formulae 1, 2 or 3 in the glass phase | 12.5 |
| (4) Alumina as aluminum powder | 10 |

The 12.5% of Formulae 1, 2 or 3 are glass phase chemicals combined with other glass phase chemicals such as sodium or potassium silicate to represent a total of 25%, which when melted together will provide a specific glass phase or fusion point when silicon carbide and aluminum are placed in combination as solids, these chemical compounds in the final coating are inter-locked with the solids which represent a total of 75%.

This combination of materials has been successfully applied as a coating to hard refractories and insulating refractories such as indicated in the following respective tables:

TABLE 1.—TYPICAL ANALYSIS, KAOLIN INSULATING REFRACTORY BRICK

| Glass phase or cone (° F.) | Al₂O₃ | SiO₂ | Fe₂O₃ | TiO₂ | CaO | MgO | Alkalies |
|---|---|---|---|---|---|---|---|
| 2,700 | 38.7 | 44.1 | 0.5 | 1.5 | 14.9 | 0.1 | 0.2 |
| 2,750 | 37.7 | 45.4 | 1.0 | 1.3 | 14.2 | 0.1 | 0.2 |
| 2,750 | 38.4 | 45.6 | 0.8 | 1.3 | 13.8 | 0.1 | 0.3 |
| 3,100 | 40.1 | 54.6 | 2.4 | 1.2 | 1.5 | 0.1 | 0.4 |
| 3,190 | 45.1 | 51.9 | 1.3 | 1.4 | 0.1 | Trace | 0.2 |

TABLE 2.—OTHER INSULATING FIRE BRICK

| Glass phase or fusion (° F.) | Al₂O₃ | SiO₂ | Fe₂O₃ | TiO₂ | CaO | MgO | Alkalies |
|---|---|---|---|---|---|---|---|
| 2,920 | 22.00 | 72.14 | 2.30 | 1.25 | 0.18 | 0.55 | 1.58 |
| 3,020 | 30.74 | 64.23 | 1.80 | 1.35 | 0.15 | 0.43 | 1.25 |
| 3,030 | 30.23 | 66.14 | 1.36 | 1.01 | 0.14 | 0.35 | 0.77 |
| 3,125 | 37.26 | 60.55 | 0.72 | 0.91 | 0.09 | 0.22 | 0.25 |
| 3,280 | 67.98 | 30.59 | 0.39 | 0.70 | 0.05 | 0.12 | 0.17 |

In preparing the coating all of the materials are mixed in powdered form and added to an equal weight of water, care being taken to stir or otherwise agitate for several minutes to avoid caking from the chemical reaction. The chemical reaction produces a gas phase which may continue for as long as seven days whereafter the material may be covered and stored for future use.

The refractory surface to which coating is to be applied should be cleaned with a curry comb removing 1/16 to 1/8 inch surface to eliminate carbon penetration from prior use and to restore the refractory surface to its condition as originally installed. Prior to application the coating should be throughly stirred and then approximately 20% by volume of water should be added and again thoroughly stirred prior to removing any of the material into other containers for use. In normal practice five to ten pounds are poured out at a time which is sufficient to cover approximately ten square feet of refractory surface. As additional material is required from the original container this should be re-stirred to keep the mixture uniform. The first coating may have certain void spots resulting in less than full coverage and a second coating is recommended to make sure of a uniform gray-black surface. When the coating is dried and the furnace is fired, the glass phase materials become molten at a temperature of 1600–1800° F., the aluminum melts, coats the silicon carbide, finally converts to aluminum oxide, and a chemical combination of the glass phase ceramic materials, silicon carbide and aluminum oxide, takes place with the refractory surface materials to produce a completely tenacious heat resistant coating capable of withstanding maximum temperatures in the order of 3400–3600° F. or some 300 degrees higher than the maximum fusion temperatures of the insulating refractory brick to which coating has been applied.

In typical installations the coating has been found to produce remarkable results. For example, 25% fuel savings; initial heat-up time reduced from 150 minutes to 58 minutes or a 61% reduction; reheating reduced from 75 minutes to 32 minutes or 57½%; and an increase in production from 900 lbs. to 1500 lbs. per day in the furnace.

Another important advantage of the coating material as applied to new furnace installations lies in the possibility of using softer, lower density insulating fire brick (in place of high density hard fire brick previously required for durability) due to the protection provided by the coating against spalling, flaking and cracking. This leads to material reductions in heat storage in the furnace walls.

While the specific materials referred to above are belived to produce optimum results, it is known that certain substitutions may be made. For example, potassium salts could be substituted for sodium salts. It is not essential that the aluminum be used, although it has been found to materially stabilize and increase the life of the silicon carbide against decomposition. Other ceramic black body solids might be used, such as molybdenum carbide or other black body carbon materials such as graphite, which combine with a glass phase product effectively protecting the black body material for temperatures equal to the glass phase of the refractory brick to which the coating is applied.

It will be understood that numerous other modifications might be resorted to without departing from the scope of the invention as defined in the following claims.

What is claimed is:
1. A refractory furnace wall coating composition consisting essentially of 12½% by weight of a ceramic composition having a molten phase in the temperature range of 1600–1800° F. including in the order of 28–30% calcium fluoride; 24–35% silica sand; 8½–16% calcium oxide; 8½–16% sodium carbonate; and 5–18% of the group consisting of: Sodium fluoride and soduim silico fluoride combined with substantially an equal quantity by weight of material from the group consisting of: Sodium silicate and potassium silicate and combined with solids comprising approximately 10% by weight of aluminum and 65% by weight of materials taken from the group consisting of: Silicon carbide, molybdenum carbide and graphite.

2. A refractory furnace wall coating composition consisting essentially of 12½% by weight of ceramic composition having a molten phase in the temperature range of 1600–1800° F. including in the order of 28–30% calcium fluoride; 24–35% silica sand; 8½–16% calcium oxide; 8½–16% sodium carbonate; and 5–18% of the group consisting of: Sodium fluoride and sodium silico fluoride combined with substantially an equal quantity by weight of material taken from the group consisting of: Sodium silicate and potassium silicate and combined with solids comprising approximately 10% by weight of aluminum and 65% by weight of materials taken from the group consisting of: Silicon carbide, molybdenum carbide and graphite.

3. A refractory furnace wall coating composition consisting essentially of the water reaction product of 12½% by weight of a ceramic composition having a molten phase in the temperature range of 1600–1800° F. including in the order of 28–30% calcium fluoride; 24–35% silica sand; 8½–16% calcium oxide; 8½–16% sodium carbonate; and 5–18% of the group consisting of: Sodium fluoride and sodium silico fluoride combined with substantially an equal quantity by weight of material taken from the group consisting of: Sodium silicate and potassium silicate and combined with approximately 10% by weight of aluminum and 65% by weight of material taken from the group consisting of: Silicon carbide, molybdenum carbide and graphite.

4. A refractory furnace wall coating composition consisting essentially of the water reaction product of 12½% by weight of a ceramic composition having a molten phase in the temperature range of 1600–1800° F. including calcium fluoride 28–30%; silica sand 24–35%; sodium silico fluoride 16–18%; calcium oxide 8½–16%; sodium carbonate 8%–16% combined with approximately an equal quantity by weight of sodium silicate and solids comprising approximately 10% by weight of aluminum and 65% by weight of silicon carbide.

References Cited
UNITED STATES PATENTS
| | | |
|---|---|---|
| 2,240,393 | 4/1941 | Dietz. |
| 2,424,054 | 7/1947 | Roach. |
| 2,656,281 | 10/1953 | Wasserman. |

FOREIGN PATENTS
| | | |
|---|---|---|
| 328,538 | 5/1930 | Great Britain. |
| 596,341 | 1/1948 | Great Britain. |

JAMES E. POER, Primary Examiner

U.S. Cl. X.R.
106—43, 44, 63, 84